UNITED STATES PATENT OFFICE.

WILLIAM D. HARTSHORNE, OF METHUEN, MASSACHUSETTS, AND EMILE MAERTENS, OF PROVIDENCE, RHODE ISLAND.

PROCESS OF TREATING WOOL-FAT AND PRODUCTS THEREOF.

SPECIFICATION forming part of Letters Patent No. 539,386, dated May 14, 1895.

Application filed September 12, 1894. Serial No. 522,840. (Specimens.)

*To all whom it may concern:*

Be it known that we, WILLIAM D. HARTSHORNE, residing at Methuen, in the county of Essex and State of Massachusetts, and EMILE MAERTENS, residing at Providence, in the county of Providence and State of Rhode Island, citizens of the United States, have invented certain new and useful Improvements in Treating Wool-Fat and Producing Products Therefrom; and we do hereby declare the following to be a full, clear, and exact description of the invention, such as will enable others skilled in the art to which it appertains to make and use the same.

We have discovered that wool-fat extracted from raw wool by solvents or by other agents or means may be separated or divided into two or more new products, both or all being constituents of said wool-fat.

By the employment of our improvement in the art or process of treating wool-fat, five resulting products are obtained from wool-fat as follows, viz: The first three products to be described we term primary products and are referred to throughout this specification as No. 4, No. 1 and No. 3, respectively, and the other two products we term intermediate products, the same being referred to herein as No. 5, and No. 2, respectively.

The object of our invention is to more thoroughly separate or divide wool-fat into products possessing different properties and characteristics, so that the various constituent parts of said wool fat, when obtained in a comparatively pure and isolated state, are in the best form to be put to the various uses for which each is best adapted. The melting point, solidity, specific gravity, and transparency of the several products vary according to the degree of completeness with which they have been separated from each other. This separation is considerably affected by the temperature and concentration of the solutions from which or by which they are extracted.

If the wool-fat, in whatever manner obtained, is not pure, one or more of the resulting products will be affected thereby to the extent and in proportion to the quantity and character of the impurity existing in said wool-fat.

When the wool-fat is obtained from the dried wool by hydrocarbon solvents and is free from sweaty matter, metal coloring, water and other common impurities, the primary products obtained herein have been found to possess the following properties.

No. 4 product is an opaque solid or nearly solid, and generally inodorous, waxy fatty matter of a whitish or yellowish white color, not soluble or but slightly soluble in cold acetone or cold alcohol, but completely soluble in about thirty times its volume of boiling acetone at 60° Fahrenheit; specific gravity, about 9.6; melting point usually about 122°. The specific gravity and the melting point of the re-precipitated product from its solution in boiling acetone vary with the class and condition of the wool to which the product owes its origin, and both the specific gravity and the melting point are higher and the product harder, the more dilute and the higher the temperature at which precipitation is made to take place, and this may vary between 32° Fahrenheit or less and just below the boiling point of acetone. That portion which precipitates at a lower temperature or greater concentration is of a lower gravity and lower melting point. The extremes of gravity so far observed range from 9.55 to 9.76 and melting points 91° Fahrenheit to 138° Fahrenheit.

No. 1 product is a transparent or translucent fluid or semi-fluid at ordinary temperatures of a yellowish red to a dark wine or brown color (when impure or discolored by metals, alkalies, heat, &c., it may be greenish or blackish and somewhat opaque) generally odorous and generally possessing a resinous and sticky or gummy nature, and is readily soluble in cold acetone and cold alcohol; specific gravity at 60° Fahrenheit usually a little greater than 10 (or water). In those cases where resin is absent or nearly absent or where it has been removed, the fluidity is greater and the gravity less. (When this product is dissolved in a dilute solution of 76° naphtha the resinous matter which it contains precipitates on standing.)

No. 3 product is an oily, transparent, translucent, semi-opaque or opaque fluid or semi-fluid or semi-solid (according to temperature and somewhat according to the class of wool to which it owes its origin) and is generally inodorous, freely soluble in cold acetone, but is not soluble or but sparingly soluble in cold alcohol; color when pure but not bleached, yellowish red to reddish brown (when not pure or discolored by metals, alkalies heat, &c., it may be greenish or blackish); specific gravity at 60° Fahrenheit about 9.6 to 9.67 in cases observed; melting point between 50° and 80° Fahrenheit (one very dark impure sample melting at about 86° Fahrenheit).

Chemically considered, wool-fat is a mixture or combination of "cholesterin" or its isomers or allied substances or alcohols with various fatty acids or resinous matters and sometimes of such matters in a free state. The exact chemical relationship of these as they exist in the original wool-fat on the sheep is doubtless very complex and probably has never been accurately determined and in the nature of the case may be undeterminable. In the wool-fat itself they no doubt vary under different circumstances and may be considerably affected by the process or materials used in its extraction or recovery, and of course therefore the chemical constituents of the divided products will be proportionally affected thereby.

After considerable investigation we are of the opinion that "true cholesterin" seldom if ever exists in the free state in wool-fat when extracted from wool (in its natural state) with chemically inactive solvents and of course therefore under such circumstances it would not appear in any of the products herein described and we do not wish to base any claim upon its presence in or absence from any of these products, as even when present its solubility in cold alcohol probably depends upon other questions than mere temperature.

In describing therefore the chemical constituents of the above described products, it is sufficient to say that the first named product No. 4, consists principally of a mixture or combinations of certain ethers or fats of "cholesterin" its isomers or allied products and other alcohols, which combination or mixture is not soluble or but slightly soluble in cold or hot alcohol and also which is not soluble or but slightly soluble in cold acetone but is fully soluble in about thirty times its volume of boiling acetone, and from which that portion of the wool-fat which will remain freely in solution in acetone at a temperature at least as low as 32° Fahrenheit has been practically eliminated. No. 1 product is principally composed of free fatty acids, certain fatty ethers and of the resinous, gummy and odorous constituents of the wool fat so far as such combinations or mixtures of substances have remained or will remain freely in solution in alcohol at a temperature at least as low as 32° Fahrenheit. No. 3 product consists principally of a mixture or combination of certain ethers of "iso-cholesterin," "cholesterin" and allied substances (with little or no fatty acids, resinous or odorous matters) which is not soluble or but slightly soluble in cold alcohol but which mixture or combination is freely soluble in cold acetone at a temperature at least as low as 32° Fahrenheit and by which reduction of temperature that product herein described as No. 4 has been eliminated and also from which that part of the wool-fat (herein called No. 1) freely soluble in cold alcohol has been eliminated.

The intermediate products No. 5 and No. 2, obtained by the processes herein described are combinations or mixtures of the foregoing so called primary products. The No. 5 product being a combination or mixture of products No. 1 and No. 3, while No. 2 is a combination or mixture of products No. 4 and No. 3. The physical and chemical properties of these two compounds will vary greatly with the proportion of their component parts in the particular wool-fat manipulated.

No. 5 product is a transparent, translucent or semi-opaque fluid or semi-fluid according to temperature, of a yellowish red to a dark wine or brown color (when impure or discolored by metals, alkalies, heat, &c., it may be greenish or blackish) like product No. 1 but to a less degree. It is generally odorous, and generally possesses a resinous, sticky or gummy nature.

No. 2 product is an opaque, fatty matter of a yellowish or reddish yellow color (when impure or discolored by metals, alkalies, heat, &c., it darkens, even up to a greenish or blackish color), and it may be solid, semi-solid or semi-fluid according to temperature.

The specific determination of No. 5 is here based principally upon its solubility in acetone at all temperatures, as low at least as 32° Fahrenheit and the separation therefrom (the No. 5), as hereinafter described of No. 1 product, by the latter's solubility in cold alcohol.

The specific determination of No. 2 is here based principally upon its insolubility or sparing solubility in cold alcohol and the separation therefrom (the No. 2), as hereinafter described of product No. 3, through the latter's solubility in acetone wherein it remains dissolved at a temperature even as low as 32° Fahrenheit.

We would state here that the five products herein described are applicable to the following uses, that is to say, No. 4 product serves as a base for ointments and other pharmaceutical and toilet preparations. No. 1 product is used as a leather and belt dressing, and when freed from its resinous matter can be used to advantage as a lubricant in conjunction with certain lubricating oils. No. 3 product forms an excellent lubricant for wool and other animal fibers. It can be used to advantage to increase the gravity and viscosity of certain lubricating oils and is very valuable in the manufacture of toilet and pharmaceutical preparations on account of its penetrating, lubricating and softening qualities. No. 5 product also serves a leather stuffing or softener, and as a belt dressing, &c.

No. 2 product is used for toilet and pharmaceutical preparations, and as a lubricant when mixed with certain lubricating oils.

In carrying our invention into effect, that is the refining of wool-fat and the production and separation from it of the said primary products, No. 4, No. 1 and No. 3, we can employ what we term the acetone-alcohol process—that is to say, the wool-fat is placed in a suitable receptacle and therein digested with cold acetone (or if preferred hot acetone, the solution afterward being cooled) until the latter is saturated with the No. 5 product which it has extracted or dissolved out of the wool-fat. This solution, in acetone of No. 5 product is then decanted into a suitable vessel or still, the remaining wool-fat being again digested with acetone and this operation is repeated and continued until all the No. 5 product contained in the wool-fat has been dissolved out and decanted into the said vessel or still. After the No. 5 product has thus been extracted and removed there will still remain in the digester that part of wool-fat which is insoluble or but sparingly soluble in cold acetone and cold alcohol, which latter part, when freed by washing, distillation or evaporation of the acetone adhering to it, forms our said product No. 4.

The No. 5 product, before referred to as having been dissolved out and decanted with the cold acetone into the vessel or still, is a residuum obtained from the distillation or evaporation of the said acetone solutions decanted from the wool-fat with which it has been digested, as stated before.

Our product No. 3 the same being one of the constituent parts of product No. 5, is obtained by digesting the latter product (No. 5) in alcohol, then decanting the resulting solution and repeating this operation until that part of No. 5 product termed by us No. 1, and which is soluble in cold alcohol, has been removed from the remaining part; and the latter when freed by distillation evaporation or otherwise from the said alcohol adhering to it constitutes the said product No. 3.

The product, No. 1, is obtained as a residuum of the distillation or evaporation of the alcohol solution decanted from product No. 5 with which it has been digested, as before described.

The said products, No. 1, No. 3 and No. 4, can also be isolated or extracted from wool-fat by the following process, which we sometimes employ and designate it as the alcohol-acetone process—that is to say, wool-fat is digested with cold alcohol. The resulting solution is then decanted, said operation being repeated until practically all that part of wool-fat which is soluble in cold alcohol has been removed from it. The last named product is also soluble in cold acetone and is identical with No. 1 product made by the former or first named process. There now remains behind an undissolved product which is hereinbefore described as No. 2, the same being composed essentially of a combination or mixture of the previously described products No. 4, and No. 3. Now, in order to isolate product No. 3 from this mixture, the latter is digested with acetone. The resulting solution is next decanted and the operation is repeated until the whole of No. 3 product has been separated or extracted, thereby leaving behind as a residuum the No. 4 product. The thus extracted solution, carrying the said No. 3 product, is further treated by distillation, or evaporation, to free it from the acetone; the resulting product being No. 3. The residuum, or No. 4 product is in turn freed, by distillation, evaporation or otherwise, from the acetone adhering to it; the thus resulting product being No. 4.

In the foregoing specification both ethylated and methylated spirits are included in the term "alcohol," but we prefer to use ethylated spirits as we find the results therefrom to be most uniform and best effected. The degree of solubility mentioned, however, is specifically intended for ninety-five per cent. ethylated spirits.

In order to more clearly indicate the characteristic solubilities of the several products produced by our improved processes, the following graphical or tabular arrangement is given.

From wool-fat we obtain:

| By acetone-alcohol process. | | | By alcohol-acetone process. | | |
|---|---|---|---|---|---|
| No. 4.—Only sparingly soluble in cold acetone and cold or hot alcohol; entirely soluble in about thirty times its volume of boiling acetone. | No. 5.—Soluble in acetone at all temperatures, at least as low as 32° Fahrenheit. | | No. 2.—Only sparingly soluble in cold alcohol. | | No. 1.—Soluble in alcohol and acetone at all temperatures, at least as low as 32° Fahrenheit. |
| | No. 1.—Soluble in acetone and alcohol at all temperatures, at least as low as 32° Fahrenheit. | No. 3.—Soluble in acetone at all temperatures, at least as low as 32° Fahrenheit; only sparingly soluble in cold alcohol. | No. 3.—Soluble in acetone at all temperatures, at least as low as 32° Fahrenheit; only sparingly soluble in cold alcohol. | No. 4.—Only sparingly soluble in cold acetone and cold or hot alcohol; entirely soluble in about thirty times its volume of boiling acetone. | |

We would state that said products No. 1 and No. 2, as obtained by the alcohol-acetone process, are substantially described and claimed (but with designating numbers reversed) in a pending application for Letters Patent filed by E. Maertens, Serial No. 536,497, January 28, 1895. Therefore we make no specific claim herewith to said products, but—

What we do claim, and desire to secure by United States Patent, is—

1. The improved method or process of refining wool-fat and separating it into certain constituent parts the same consisting in treating it with acetone, thereby separating from the wool-fat that part which is soluble in cold acetone, and designated herein as product No. 5, then decanting the resulting solution, thereby leaving that part of the wool-fat which has not dissolved in cold acetone and is designated herein as product No. 4, and then eliminating the acetone from the said resulting solution, to obtain the above named product No. 5, while the undissolved part when freed from acetone forms the above named product No. 4, substantially as hereinbefore described.

2. The improved method or process of refining wool-fat and separating it into three constituent parts, which consists in mixing or incorporating acetone with wool-fat and separating from said wool-fat that constituent part of it which is soluble in cold acetone and is herein designated as product No. 5, while the other constituent part herein designated as product No. 4, remains undissolved, then eliminating the acetone from the soluble constituent part to obtain said product No. 5, and from the residuary or undissolved part to obtain said product No. 4, (the thus resulting two products being the only separated constituent parts of the original wool-fat) then incorporating alcohol with said No. 5 product to separate therefrom that part which is soluble in cold alcohol (which said soluble part when freed from alcohol forms the product herein designated as No. 1), and leaving behind that part of said product which has not dissolved in cold alcohol and which when freed from its adhering alcohol forms the new product herein designated as No. 3; the resulting products No. 1, and No. 3, being separated constituent parts of said new product No. 5, substantially as hereinbefore described.

3. The method or process of refining wool-fat and separating it into three constituent parts, which consists in mixing or incorporating alcohol with wool-fat, then separating from said wool-fat by extraction that constituent part of it which is soluble in cold alcohol and is herein designated as No. 1 product, while the other constituent part which is designated herein as product No. 2, (and which is a mixture or combination of the constituent parts of the products designated herein as No. 4, and No. 3) remains undissolved, then eliminating the alcohol from this undissolved or residuary part (and designated as product No. 2), and then incorporating acetone with it and separating therefrom by extraction that part which is soluble in cold acetone and is designated herein as product No. 3, and leaving behind that part which remains undissolved and which when freed from acetone forms the new product designated herein as No. 4, whereas that part which was dissolved out with acetone when freed from the latter agent forms the new product No. 3, substantially as hereinbefore described.

4. As a new article of manufacture the refined opaque solid or nearly solid, and generally inodorous waxy and fatty product generally of a whitish or yellowish white color hereinbefore described as No. 4 product, the same being insoluble or but slightly soluble in cold acetone and cold alcohol but completely soluble in about thirty times its volume of boiling acetone and which can be obtained as a residuum from wool-fat after the latter has been freed by extraction with acetone from its other constituent part (herein designated as product No. 5), and which is soluble in cold acetone, substantially as set forth.

5. As a new article of manufacture the refined opaque solid or nearly solid and generally inodorous waxy and fatty product generally of a whitish or yellowish white color hereinbefore described as No. 4 product, the same being insoluble or but slightly soluble in cold acetone and cold alcohol but completely soluble in about thirty times its volume of boiling acetone and which can be obtained as a residuum from the wool-fat product herein designated as No. 2, after the latter has been freed by extraction with acetone from its other constituent part which is herein designated as product No. 3, which is soluble in cold acetone, substantially as set forth.

6. As a new article of manufacture the refined transparent, or translucent or semi-opaque resinous, sticky and generally odorous fluid, semi-fluid or semi-solid designated herein as product No. 5, the same being soluble in cold acetone and being one constituent part of wool-fat separated by extraction from its other opaque fatty, waxy, solid or semi-solid constituent part which is designated herein as product No. 4, which latter is not soluble or but slightly soluble in cold acetone, substantially as set forth.

7. As a new article of manufacture the refined transparent, translucent or semi-opaque, oily fluid semi-fluid or semi-solid product from wool-fat soluble in cold acetone but insoluble or but slightly soluble in cold alcohol, and which can be obtained by separation from the product designated herein as No. 5, when the latter is digested with cold alcohol, and which new product remains undissolved by such digestion and when freed from said alcohol constitutes the product designated herein as No. 3, substantially as described.

8. As a new article of manufacture the refined transparent, translucent or semi-opaque or opaque oily fluid semi-fluid or semi-solid product from wool-fat, soluble in cold acetone but insoluble or but slightly soluble in cold alcohol, and which can be obtained by digesting the product designated herein as No. 2, (which is a mixture of No. 4, and No. 3 products) with cold acetone, which leaves behind undissolved the product herein designated as No. 4 and undissolved out the other constituent part of said mixture, which when freed from acetone is the product herein designated as No. 3, substantially as described.

In testimony whereof we have affixed our signatures in presence of two witnesses.

WM. D. HARTSHORNE.
EMILE MAERTENS.

Witnesses:
JAMES A. RICHARDSON,
WILLIAM M. ROGERS.